United States Patent [19]

Sun et al.

[11] Patent Number: 5,677,594

[45] Date of Patent: Oct. 14, 1997

[54] TFEL PHOSPHOR HAVING METAL OVERLAYER

[76] Inventors: Sey-Shing Sun, 15375 SW. Nightingale Ct., Beaverton, Oreg. 97007; Michael S. Bowen, 8825 SE. 30th Ave., Milwaukie, Oreg. 97222

[21] Appl. No.: 509,745

[22] Filed: Aug. 1, 1995

[51] Int. Cl.⁶ .................................................. H05B 33/00
[52] U.S. Cl. ...................... 313/503; 313/502; 313/506; 313/509
[58] Field of Search ................................. 313/503, 498, 313/502, 506, 509

[56] References Cited

U.S. PATENT DOCUMENTS

| | | | |
|---|---|---|---|
| 4,634,639 | 1/1987 | Kawai | 313/503 |
| 4,751,427 | 6/1988 | Barrow et al. | 313/503 |
| 4,900,584 | 2/1990 | Tuenge et al. | 427/66 |
| 5,309,070 | 5/1994 | Sun et al. | 313/503 |

OTHER PUBLICATIONS

Red and Blue Electroluminescence in Alkaline-Earth Sulfide Thin-Film Devices, Tanaka, et al., SID 86 Digest, pp. 29–32, 1986.
Multi-Color TFEL Display Panel with a Double-Hetero-Interface Structured Active Layer, Nire et al., 4 pages, 1992.
White Light Emitting Thin Film Electroluminescent Cell With Stacked SrS:Ce/CaS:Eu Active Layers, Ono et al., Journal of Luminescence 40&41 (1988), pp. 796–797.
Device Structure and Processing of Color El Displays, King, pp. 59–67, 1990.
Luminance Improvement of Blue– and White-Emitting SrS TFEL Devices By Annealing In Ar–S Atmosphere, Tanaka et al., IEEE 1991, pp. 137–140, 1991.
Efficient Electroluminescent Devices Based on ZnS/SrS:Ce Multilayered Phosphors, Velthaus et al., pp. 187–192, 1992.
High Luminance ZnS:Mn/SrS:Ce TFEL Devices, Velthaus et al., 4 pages, 1994.
Bright and stable blue electroluminescent device based on SrS:Ce, Soininen et al., pp. 233–236, 1993.
Blue–Green Color TFEL Device with Sputtered SrS:Ce Thin Films, Ohnishi, SID 89 Digest, pp. 317–320, 1989.
Electroluminescence and Photoluminescence of Cerium-Activated Alkaline Earth Thiogallate Thin Films and Devices, Sun et al., J. Electrochem. Soc., vol. 141, No. 10, Oct. 1994, pp. 2877–2883.
Role of Surface Energy in Thin-Film Growth of Electroluminescent ZnS, CaS and SrS, Yoshiyama et al., Journal of Crystal Growth 86 (1988), pp. 56–60, 1988.
Luminance Improvement of Blue Green Emitting SrS;Ce El Cell by Controlling Vacuum conditions with Sulfer Addition, Onisawa et al., J. Electrochem. Soc.: Solid–State Science and Technology, Oct. 1988, pp. 2631–2634.

*Primary Examiner*—Nimeshkumar Patel
*Attorney, Agent, or Firm*—Chernoff, Vilhauer, McClung & Stenzel

[57] ABSTRACT

An electroluminescent phosphor is sandwiched by a pair of insulating layers which are sandwiched by a pair of electrode layers to provide an AC TFEL device. The phosphor consists of a host material and an activator dopant that is preferably a rare earth. The host material is an alkaline earth sulfide, an alkaline earth selenide or an alkaline earth sulfide selenide that includes a Group 3A metal selected from aluminum, gallium and indium. The phosphor is preferably fabricated by first depositing a layer of the alkaline earth sulfide, alkaline earth selenide or alkaline earth sulfide selenide including the rare earth dopant therein, depositing thereon an overlayer selected from an alkaline earth thiogallate, an alkaline earth thioindate, an alkaline earth thioaluminate, an alkaline earth selenoaluminate, an alkaline earth selenoindate, or an alkaline earth selenogallate. The two layers are annealed at a temperature preferably between 750° and 850° C.

5 Claims, 6 Drawing Sheets

TFEL PHOSPHOR HAVING METAL OVERLAYER

This invention relates to an AC TFEL device and, more particularly, to an AC TFEL device having a phosphor suitable for multicolor and full color panels. This invention further relates to a method of making such TFEL devices.

BACKGROUND OF THE INVENTION

In recent years researchers in the development of electroluminescent thin films have concentrated on new phosphor materials for multicolor or full color panels. In general, there are two different approaches for fabricating a multicolor or full color thin film electroluminescent phosphor on a single substrate: one approach is based on a patterned phosphor, and the other is based on a filtered broad band emitting phosphor. In a patterned phosphor structure, each pixel consists of a red light-emitting, a green light-emitting, and a blue light-emitting phosphor subpixel. During fabrication, each one of the three color light-emitting phosphors is deposited on a first insulator layer and then etched into thin stripes. The sequential deposition and subsequent etching of the three phosphors forms a continuous phosphor layer. A second insulator layer is deposited on the phosphor layer and the thin film electroluminescent panel is finished conventionally. The patterned phosphor structure permits efficient use of the luminance from the individual color phosphors, and employs a simple electronic driving scheme. However, the phosphor patterning process is a complicated and therefore costly procedure. In addition, in order to obtain good contrast from this structure, a high luminance performance is required of each individual color light-emitting phosphor. Typically, the blue light-emitting phosphor does not provide a satisfactory luminance.

The structure based on a filtered broad band emitting phosphor strongly resembles a conventional monochrome panel. Patterned filters deposited over a single broad band emitting phosphor filter out the red, green, and blue colors from the emitted light. The structure is preferably inverted compared to the conventional structure so that light emission through the color filters is viewed from the film side of the structure. Alternatively, broad band or white light emission is obtained from multiple layers of primary color light-emitting phosphors such as superimposed layers of a red light-emitting phosphor and a blue-green light-emitting phosphor. Compared to the patterned phosphor structure, the filtered broad band phosphor structure provides better matched electro-optical performance between colors, and excellent contrast because most of the ambient light is absorbed in the color filters.

For a practical thin-film electroluminescent (TFEL) display, an electroluminescent panel is driven with voltage pulses at 30–100 Hz. The minimum luminance requirement for a full color TFEL display has been specified by King as a minimum white luminance of 35 cd/m$^2$. King reports that to obtain a full-color TFEL display from the minimum white areal luminance of 35 cd/m$^2$, the minimum areal luminance requirements for the color components for 60 Hz luminance are: red, 9.3 cd/m$^2$ (pixel luminance of 37.1 cd/m$^2$); green, 23.0 cd/m$^2$ (pixel luminance of 92.0 cd/m$^2$); and blue, 2.7 cd/m$^2$ (pixel luminance of 10.8 cd/m$^2$). C. N. King, "Device Structure and Processing of Color EL Displays," *Polytechnica Scandinavica Ph* 170: *Fifth Int'l Workshop on Electroluminescence*, 59–67 (1990). Since more than 65% of this white luminance comes from the green and blue color components, the performance of the full color display panel depends greatly on the luminance performance of the phosphor or phosphors providing the green light and blue light emissions.

Promising blue light-emitting and broad band emitting phosphors are based on alkaline earth sulfides such as strontium sulfide, as shown, for example, in U.S. Pat. No. 4,751,427 to Barrow et al. To achieve broad band emission, strontium sulfide is doped with cerium for blue and green light emission and with europium for red light emission in either a single layer (SrS:Ce,Eu) or in multiple layers (SrS:Ce and SrS:Eu). Alternatively, properly doped blue and green light-emitting alkaline earth sulfides may be combined in a multi-layered structure with other red light-emitting phosphors such as manganese-doped zinc sulfide to achieve white light emission.

Yoshiyama and others have studied the x-ray diffraction patterns of alkaline earth sulfide films deposited by various methods. Results of the studies indicate that the crystalline structure of CaS and SrS films depends on the temperature of the substrate on which the film is grown. Theoretical calculations by Yoshiyama and others have predicted that the most favored plane in an SrS thin film formed near room temperature has an orientation in the (200) direction; as the substrate temperature is increased, between 450° and 650° C., the most favored plane has an orientation in the (220) direction. Investigators have found that evaporated, CaS and SrS thin films follow the prediction fairly well. H. Yoshiyama et al., "Role of Surface Energy in Thin-Film Growth of Electroluminescent ZnS, CaS and SrS," *J. Crystal Growth* 86, 56–60 (1988).

Onisawa and others have shown that the partial pressure of sulfur during the deposition of SrS films also affects the crystalline structure and thus the performance of the phosphor. Results indicate that at lower sulfur partial pressures the most favored plane in a SrS thin film has an orientation in the (200) direction. With increasing sulfur partial pressure, the most favored plane becomes the plane having an orientation in the (220) direction. K. Onisawa et al., "Luminance Improvement of Blue-Green Emitting SrS:Ce EL Cell by Controlling Vacuum Conditions With Sulfur Addition," *J. Electrochem. Soc.* 135, 2631–34 (1988).

Tanaka and others have reported that a post-deposition anneal at 630° C. in an argon-sulfur mixed gas atmosphere of blue light-emitting and white light-emitting strontium sulfide electroluminescent thin films prepared by electron beam evaporation with sulfur co-evaporation improved the luminance and efficiency of the films. S. Tanaka et al., "Luminance Improvement of Blue- and White-Emitting SrS TFEL Devices by Annealing in Ar-S Atmosphere," *Conf. Record of Int'l Display Research Conf.*, 137–40 (1991).

Velthaus and others have reported improved luminance and efficiency in multilayer structures of zinc sulfide and cerium-doped strontium sulfide fabricated with both multi-source reactive evaporation and electron beam evaporation. K. O. Velthaus, et al., "Efficient Electroluminescent Devices Based on ZnS/SrS:Ce Multi-layered Phosphors," *Electroluminescence: Proc. of the Sixth Int'l Workshop on Electroluminescence*, 187–92 (1992). Velthaus and others reported further improvement in luminance and efficiency of strontium sulfide films doped with cerium by using a novel sulfur precursor during reactive evaporation. K. O. Velthaus, et al., "High Luminance ZnS:Mn/SrS:Ce TFEL Devices," *Proc. of 14th Int'l Display Research Conf.*, 346–49 (1994).

Soininen and others prepared cerium-doped strontium sulfide thin films by atomic layer epitaxy (ALE) and reported an L$_{40}$ of 100 cd/m$^2$ at 60 Hz. E. Soininen et al., "Bright and Stable Blue Electroluminescent Device Based on SrS:Ce," *Proc. Eurodisplay: 13th Int'l Display Research Conf.*, 233–36 (1993). Although ALE is an excellent production technique, reliable precursors for Sr and Ce are hard to synthesize and very costly. The limited selection of suitable ALE-applicable precursors further constrains phosphor improvement because it is hard to modify the phosphor material, for example by adding a new co-dopant, or the device structure, for example by adding an injection layer.

Since alkaline earth sulfide thin films tend to be deficient in sulfur and can be easily oxidized in air, sulfur co-evaporation is typically employed when fabricating such phosphors with evaporation techniques. However, co-evaporation of sulfur is very hard to control due to the non-linear response of the sulfur vapor pressure to the source heater temperature. Furthermore, because strontium sulfide is very hygroscopic, it must be protected by an overlayer deposited before the phosphor layer is exposed to the atmosphere to prevent moisture from entering the phosphor layer. The evaporated films tend also to be porous, and complete avoidance of moisture during fabrication is difficult. Therefore, it is not expected that evaporation techniques can be economically applied to the practical manufacture of alkaline earth sulfide-based TFEL display panels.

Ohnishi and others investigated sputtering as a method for preparing cerium-doped strontium sulfide films. H. Ohnishi et al., "Blue-Green Color TFEL Device With Sputtered SrS:Ce Thin Films," *Digest SID Int'l Symposium*, 317–20 (1989). The investigators observed a maximum luminance of 700 cd/m$^2$ at 1 KHz ($L_{40}$ is 200 cd/m$^2$ at 1 KHz). Sputtering is a cost-effective production technique. However, this luminance is inferior to the luminance obtained with other techniques.

Thus, a need exists for a phosphor and a method of making a thin film electroluminescent phosphor for a full color or multicolor TFEL matrix display that overcomes the problems of prior phosphors.

SUMMARY OF THE INVENTION

According to the present invention, such a need is satisfied by an AC TFEL device having an electroluminescent phosphor sandwiched by a pair of insulating layers which are themselves sandwiched by a pair of electrode layers. The electroluminescent phosphor comprises a host material and an activator dopant, the host material being selected from an alkaline earth sulfide, an alkaline earth selenide, and an alkaline earth sulfide selenide, wherein the host material further includes therein a Group 3A metal selected from aluminum, gallium and indium. The phosphor provides an electroluminescent thin film of superior performance suitable for use in a full color or multicolor TFEL matrix display.

According to another aspect of the invention, the AC TFEL device is made by depositing a first electrode set on a transparent substrate, depositing on the first electrode set a first insulator layer and thereafter depositing on the first insulator layer an electroluminescent phosphor layer. The phosphor layer includes a host material and an activator dopant, the host material being selected from an alkaline earth sulfide, an alkaline earth selenide and an alkaline earth sulfide selenide. Thereafter, an overlayer of a compound selected from the group consisting of an alkaline earth thiogallate, an alkaline earth thioindate, an alkaline earth thioaluminate, an alkaline earth selenoaluminate, an alkaline earth selenoindate, and an alkaline earth selenogallate is deposited on the electroluminescent phosphor layer. The phosphor layer and its overlayer are heated to a temperature greater than 650° C. Thereafter, a second insulator layer and a second electrode set are deposited. In a preferred embodiment the phosphor layer and its overlayer are deposited by sputtering because the technique is readily applicable to full-scale production of TFEL panels.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
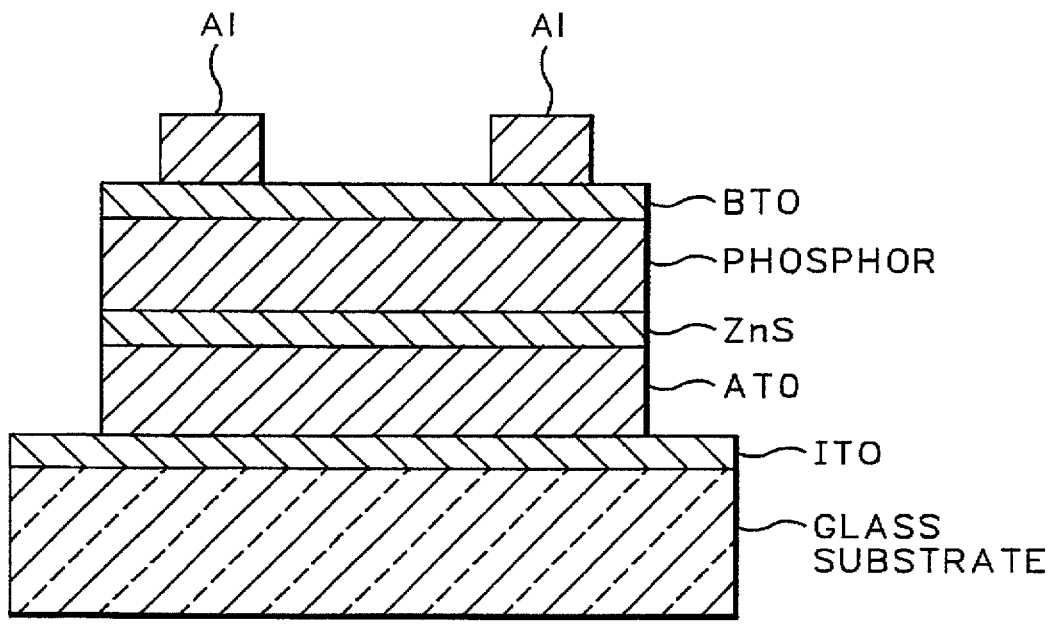
FIG. 1 is a sectional view of an AC TFEL device embodying the present invention.

Referring now to FIG. 1, a TFEL device fabricated according to the present invention has a glass substrate which supports a first electrode layer of transparent indium tin oxide (ITO). A first insulator layer is deposited on top of the first electrode layer. A preferred insulator is aluminum titanium oxide (ATO) deposited in a layer having a thickness of 2600 Å (260 nm). A layer of zinc sulfide which has a thickness between 50 and 400 Å (5–40 nm) is deposited on the first insulator layer. Both the ATO and zinc sulfide layers are preferably deposited by atomic layer epitaxy (ALE). An electroluminescent phosphor is deposited between the zinc sulfide layer and a top insulator layer. A preferred top insulator layer is a layer of barium tantalate (BTO) that is 3000 Å (300 nm) thick. A top electrode layer, deposited on the top insulator layer, is formed of electrodes made of aluminum.

The electroluminescent phosphor is a host material that includes therein aluminum, gallium or indium and an activator dopant. The activator dopant includes preferably a rare earth such as europium, cerium, praseodymium, or holmium. The host material is selected from an alkaline earth sulfide, an alkaline earth selenide and an alkaline earth sulfide selenide, and is represented by the formula $M^{II}S_ySe_{1-y}$, where $0 \leq y \leq 1$, and $M^{II}$ is selected from the group strontium, calcium, barium and magnesium. When y=0, the host material is SrSe, CaSe, MgSe or BaSe. When y=1, the host material is SrS, CaS, MgS or BaS. When y is a number between 0 and 1, the host material is an alkaline earth sulfide selenide, for example, $SrS_{0.5}Se_{0.5}$, $CaS_{0.5}Se_{0.5}$, $MgS_{0.5}Se_{0.5}$ or $BaS_{0.5}Se_{0.5}$ (when y=0.5). In a preferred embodiment the host material is SrS ($M^{II}$ is strontium and y=1). Referring to FIG. 1, an exemplary phosphor is cerium fluoride-doped strontium sulfide having gallium therein.

Figure 2:
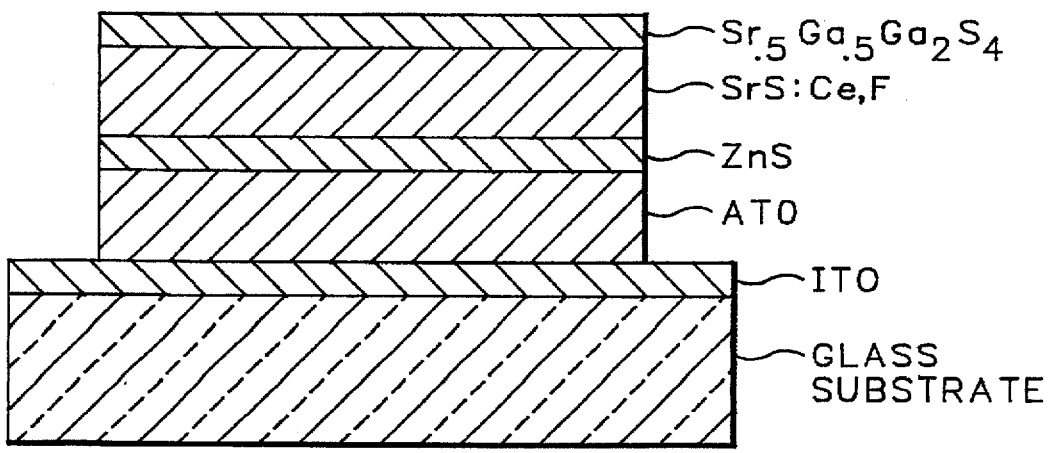
FIG. 2 is a sectional view of the AC TFEL device of FIG. 1 shown during fabrication.

Referring particularly to FIG. 2, the phosphor is fabricated by depositing on the zinc sulfide layer a layer of an alkaline earth sulfide, an alkaline earth selenide or an alkaline earth sulfide selenide having a rare earth dopant therein, and then by depositing thereon an overlayer of an alkaline earth thiogallate, an alkaline earth thioindate, an alkaline earth thioaluminate, an alkaline earth selenoindate, an alkaline earth selenoaluminate or an alkaline earth selenogallate (for example, $CaIn_2Se_4$, $SrAl_2Se_4$, or $Ca_{0.5}Sr_{0.5}Ga_2Se_4$). For example, as shown in FIG. 2, a layer of strontium sulfide having a cerium fluoride dopant therein and a thickness between 6000 Å and 15000 Å (600 to 1500 nm) is deposited on the zinc sulfide layer. The alkaline earth sulfide, alkaline earth selenide or alkaline earth sulfide selenide is deposited by sputtering from the appropriate target which has been prepared with the desired rare earth dopant concentration. The preferred dopant concentration when the dopant is cerium fluoride is between 0.1 to 0.8 mol % $CeF_3$. The substrate temperature during the deposition is held between 250° and 450° C. The rare earth doped alkaline earth sulfide, rare earth doped alkaline earth selenide or rare earth doped alkaline earth sulfide selenide phosphor layer then receives by sputtering an overlayer of a thiogallate, thioindate, thioaluminate or the ternary selenide of gallium, aluminum or indium, the overlayer being 50 to 600 Å (5 to 60 nm) thick. In a preferred embodiment the overlayer is $Ca_xSr_{1-x}Ga_2S_4$; that is $CaGa_2S_4$ (when x=1), $SrGa_2S_4$ (when x=0) or calcium strontium thiogallate (when 0<x<1; for example, $Ca_{0.5}Sr_{0.5}Ga_2S_4$ when x=0.5).

The phosphor layer and overlayer are annealed in nitrogen at a temperature greater than 650° C., for example as disclosed in U.S. Pat. No. 4,900,584, which is hereby incorporated by reference. A preferred annealing temperature range is between 750° and 850° C. The most preferred annealing temperature is 810° C.

The performance of the phosphor depends on the temperature at which the layers are annealed. Phosphors were fabricated from cerium fluoride-doped strontium sulfide with an overlayer 500 Å (50 nm) thick of strontium calcium thiogallate ($Ca_{0.5}Sr_{0.5}Ga_2S_4$) and annealed at 650° C., 750° C., 810° C. or 850° C. No improvement in luminance was observed when the phosphor was annealed at 650° C. ($L_{40}$, the luminance 40 volts above the threshold voltage, =3.8 cd/m²). The performance of the phosphor was greatly improved when the phosphor was annealed at temperatures of 750° C. and above. The optimum performance ($L_{40}$=72.0 cd/m²) was observed when the phosphor was annealed at 810° C. These results are summarized and presented in Table 1.

TABLE 1

The effect of annealing temperature on the performance of SrS:Ce,F devices with a 500 Å $Ca_{.5}Sr_{.5}Ga_2S_4$ overlayer.

| Anneal Temp. (°C.) | Threshold Voltage (V) | $L_{40}$ at 60 Hz (cd/m²) | Lum. Effic. (lm/W) | CIE (x) | CIE (y) |
|---|---|---|---|---|---|
| 650 | 144 | 3.8 | 0.03 | 0.24 | 0.42 |
| 750 | 125 | 55.0 | 0.32 | 0.27 | 0.51 |

TABLE 1-continued

The effect of annealing temperature on the performance of SrS:Ce,F devices with a 500 Å $Ca_{.5}Sr_{.5}Ga_2S_4$ overlayer.

| Anneal Temp. (°C.) | Threshold Voltage (V) | $L_{40}$ at 60 Hz (cd/m²) | Lum. Effic. (lm/W) | CIE (x) | CIE (y) |
|---|---|---|---|---|---|
| 810 | 114 | 72.0 | 0.70 | 0.28 | 0.51 |
| 850 | 110 | 70.0 | 0.65 | 0.29 | 0.52 |

The dramatic improvement in the performance of the rare earth-doped strontium sulfide phosphors is due to the thiogallate overlayer, although the precise reason for the improved performance is unknown. When the phosphor lacks an overlayer or when the phosphor is sandwiched between two zinc sulfide layers, the phosphor exhibits very poor performance when annealed at 810° C.; for example, $L_{40}$ is 4 or 5 cd/m² with a luminous efficiency of 0.04 lm/W at a 60 Hz drive frequency. The emission color of the rare earth-doped strontium sulfide with a zinc sulfide overlayer has CIE coordinates of x=0.20, y=0.38. With an overlayer 500 Å thick of $Sr_{0.5}Ca_{0.5}Ga_2S_4$ on the doped strontium sulfide layer, and after being annealed at 810° C., $L_{40}$ increases to 72.0 cd/m². The emission color of the doped strontium sulfide with the thiogallate overlayer becomes desaturated (CIE coordinates of x=0.28, y=0.51) but the luminous efficiency is significantly improved. These results are summarized in Table 2 below.

TABLE 2

The effect of overlayer on the performance of SrS:Ce,F devices when annealed at 810° C.

| Overlayer | Threshold Voltage (V) | $L_{40}$ at 60 Hz (cd/m²) | Lum. Effic. (lm/W) | CIE (x) | CIE (y) |
|---|---|---|---|---|---|
| None | 117 | 4.1 | 0.04 | 0.21 | 0.38 |
| ZnS 300 Å | 124 | 4.8 | 0.04 | 0.20 | 0.38 |
| $Sr_{.5}Ca_{.5}Ga_2S_4$ 500 Å | 114 | 72.0 | 0.70 | 0.28 | 0.51 |

Figure 3:
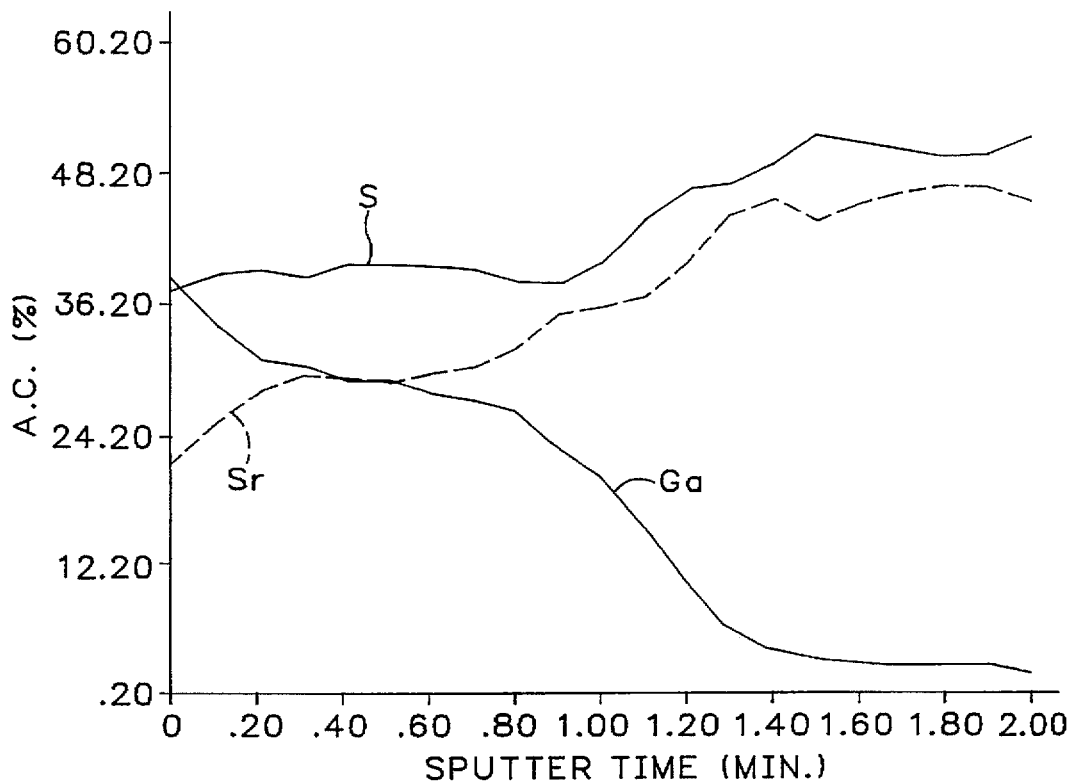
FIGS. 3–5 show the Auger depth profiles of selected elements in TFEL phosphors that have been annealed at different temperatures.
Figure 4:
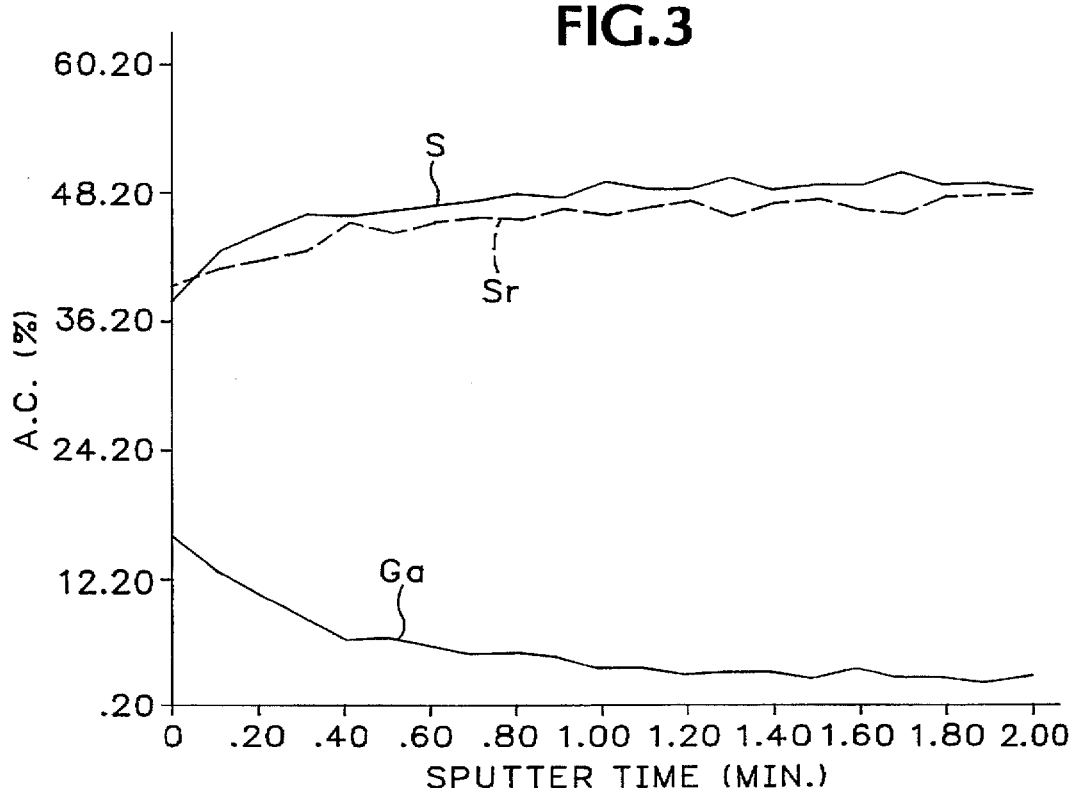
Figure 5:
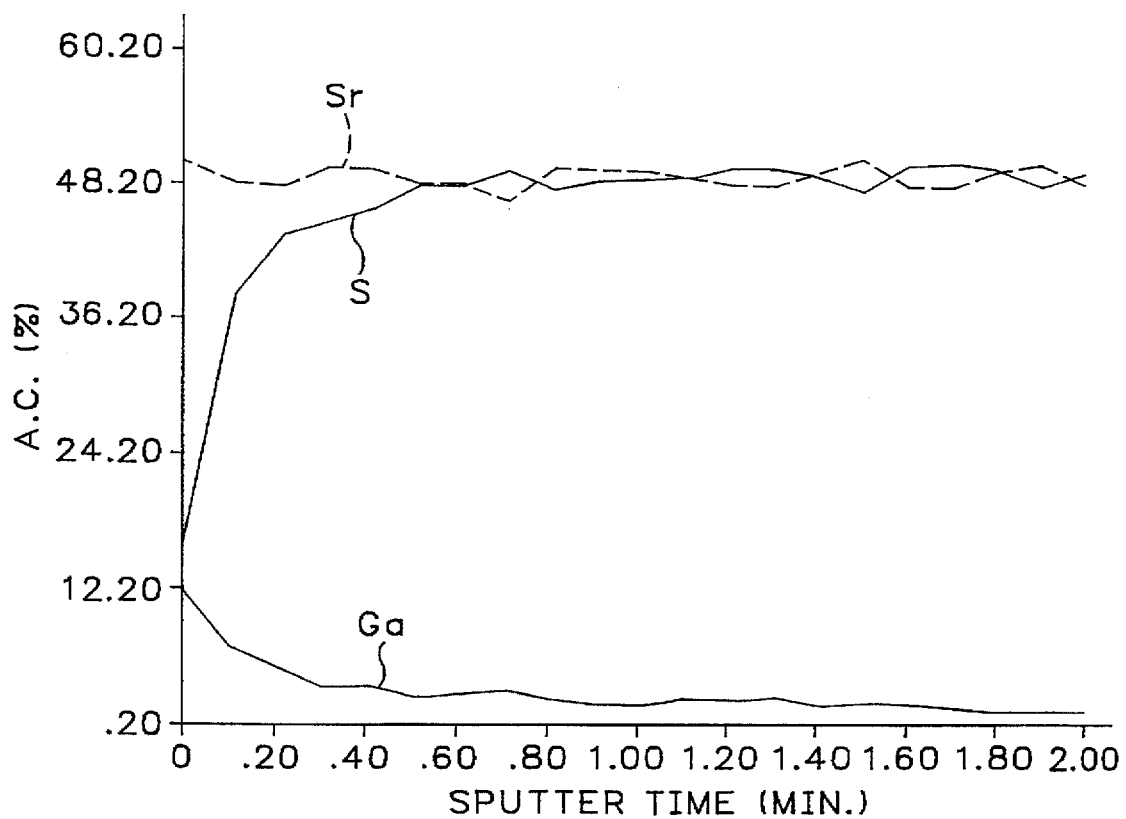

Referring now to FIGS. 3–5, cerium fluoride-doped strontium sulfide thin films with thiogallate overlayers were annealed at different temperatures, and the Auger depth profiles of the elements gallium, strontium and sulfur in the annealed films were recorded. The thiogallate overlayer remains intact when the phosphor is annealed at 650° C. (FIG. 3). During the higher temperature anneals, gallium diffuses out of the original thiogallate overlayer and into the doped strontium sulfide layer. When the annealing temperature is 750° C., significant amounts of gallium diffuse out of the thiogallate overlayer into the doped strontium sulfide layer (FIG. 4). When the phosphor is annealed at 810° C., the gallium in the original thiogallate overlayer is almost depleted (FIG. 5). The gradual leveling of the sulfur profile at higher annealing temperatures shows that the thiogallate overlayer is converted almost completely into strontium calcium sulfide at 810° C.

Figure 6:
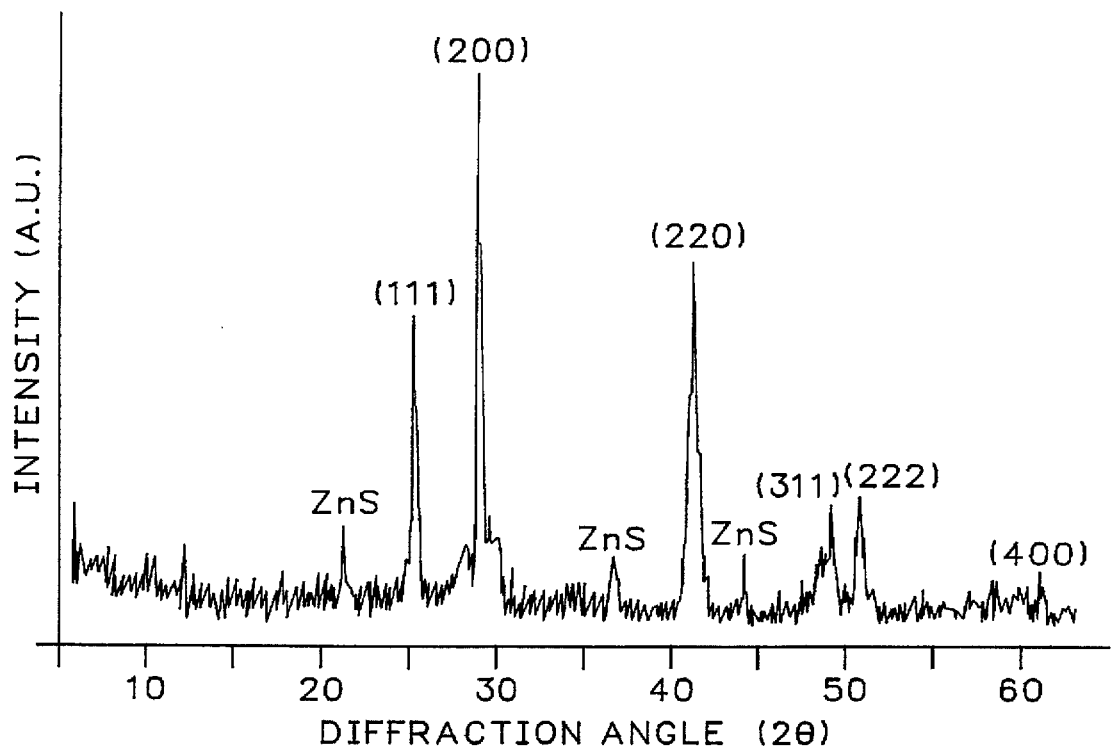
FIG. 6 shows the x-ray diffraction pattern of a TFEL phosphor prepared with a zinc sulfide overlayer and annealed at 810° C.
Figure 7:
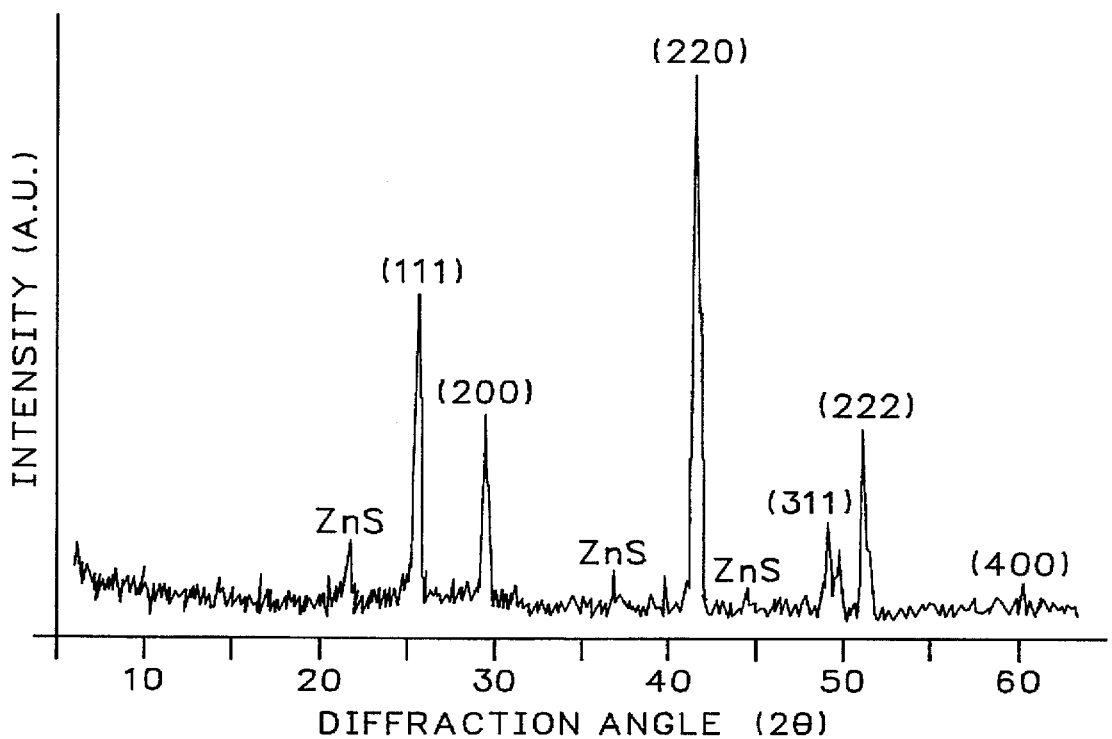
FIG. 7 shows the x-ray diffraction pattern of a TFEL phosphor prepared with a thiogallate overlayer and annealed at 810° C.

The x-ray diffraction pattern of a cerium-doped strontium sulfide film depends on the crystalline structure of the film. As shown in FIG. 6, a cerium-doped strontium sulfide film with a 300 Å thick zinc sulfide overlayer annealed at 810° C. has a strong x-ray reflection from the (200) planes. A cerium-doped strontium sulfide phosphor with a 500 Å thick overlayer of thiogallate and annealed at 810° C. has the strongest reflection from the (220) planes and intensity from the (200) planes is only half that of the (220) planes (FIG. 7). In addition, as shown in FIG. 7 there are no reflections that indicate that any thiogallate crystals are present in the sample. The ratio of the x-ray intensity between the (220) and (200) planes also increases with the annealing temperature. These results are presented in Table 3.

TABLE 3

| Overlayer | Anneal Temperature (°C.) | $L_{40}$ at 60 Hz (cd/m$^2$) | XRD I(220)/I(200) Intensity Ratio |
|---|---|---|---|
| None | 810 | 4.1 | 0.56 |
| ZnS 300 Å | 810 | 4.8 | 0.64 |
| Sr$_.5$Ca$_.5$Ga$_2$S$_4$ 500 Å | 650 | 3.8 | 1.21 |
| Sr$_.5$Ca$_.5$Ga$_2$S$_4$ 500 Å | 750 | 55.0 | 2.05 |
| Sr$_.5$Ca$_.5$Ga$_2$S$_4$ 500 Å | 810 | 72.0 | 2.65 |

The improved luminance performance of the structures correlates with the development of orientation in the (220) direction, which is due to the diffusion of the gallium from the thiogallate layer into the strontium sulfide lattice. The improved luminance performance is similar to the improvement in performance noted due to increasing substrate temperature during the deposition of evaporated SrS films or due to increasing the partial pressure of sulfur during the deposition of evaporated SrS films. It is not clear how the incorporated gallium atoms change the crystallinity of the SrS film. The gallium may substitute with strontium and generate lattice strain because of the difference in ion size and valence mismatch. Such lattice strain may act as the driving force that induces the observed structural change in the SrS films.

Figure 8:
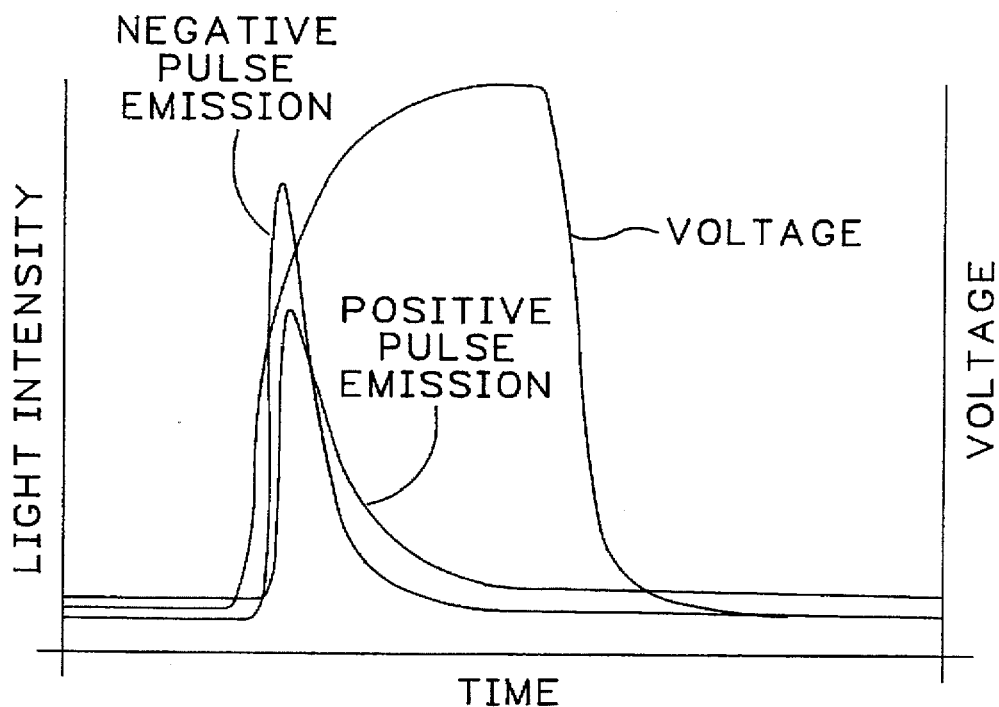
FIG. 8 shows the time resolved voltage and emission measurement of a TFEL phosphor prepared with a zinc sulfide overlayer and annealed at 810° C.
Figure 9:
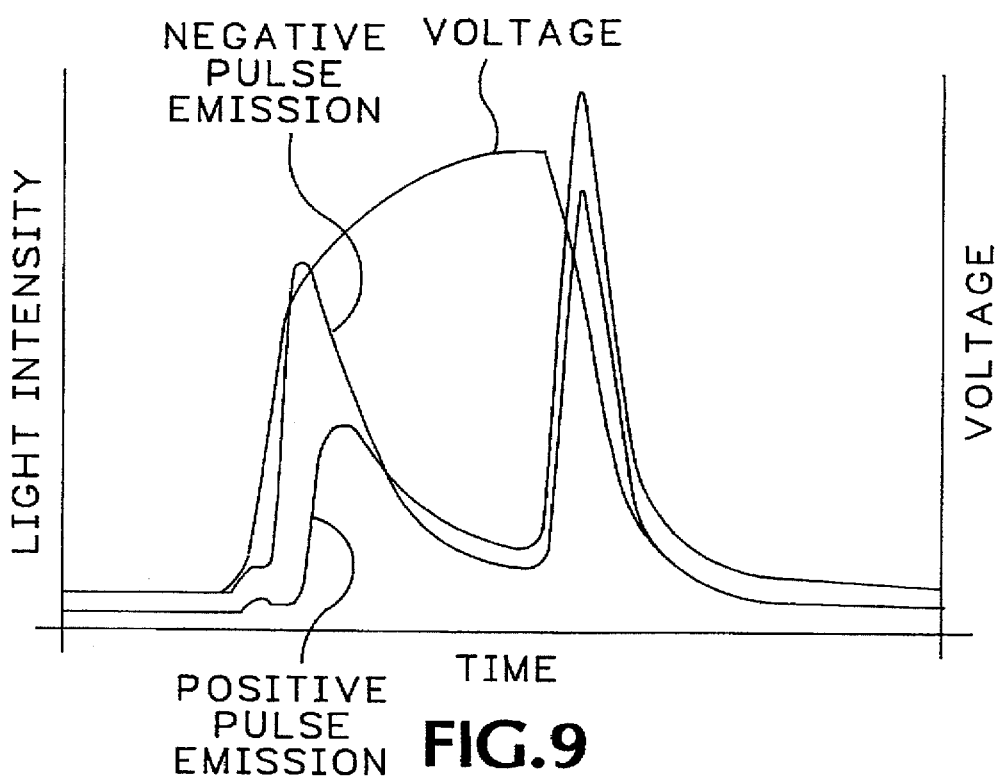
FIG. 9 shows the time resolved voltage and emission measurement of a TFEL phosphor prepared with a thiogallate overlayer and annealed at 810° C.

Referring to FIG. 8, a time-resolved voltage and emission measurement of a doped strontium sulfide phosphor with a zinc sulfide overlayer annealed at 810° C. has only a leading edge emission peak during both polarities of the voltage pulse. For a device fabricated from doped strontium sulfide with a thiogallate overlayer, and annealed at 810° C., the time-resolved voltage and emission measurement has both leading edge and trailing edge emission peaks during both polarities of the voltage pulse (FIG. 9). Thus, in addition to improving crystalline structure, gallium incorporation into the strontium sulfide film may introduce more donor states and increase the space charge density in strontium sulfide, which in turn enhances the trailing edge emission and reduces the threshold voltage.

Figure 10:
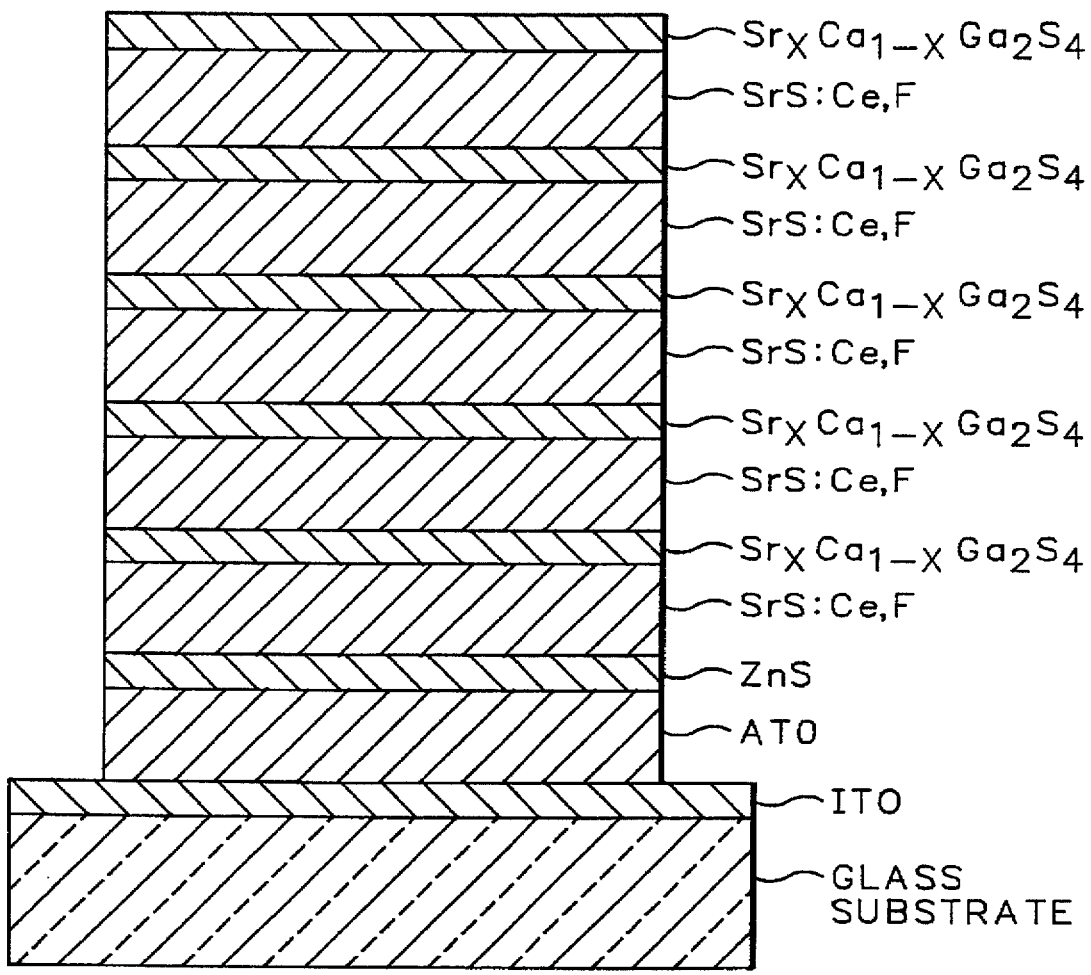
FIG. 10 is a sectional view of a multilayer TFEL device shown during fabrication according to the present invention.

In another preferred embodiment, a multilayered TFEL device having thiogallate layers between multiple strontium sulfide layers was prepared according to the present invention. The device was prepared by depositing the first electrode layer and first insulator layer as described above. The phosphor was fabricated with five layers of cerium-doped strontium sulfide. Each strontium sulfide layer was 200 Å thick, and each layer had a 300 Å thick overlayer of Sr$_{0.5}$Ca$_{0.5}$Ga$_2$S$_4$ (FIG. 10). After deposition of the final thiogallate layer the device was annealed in nitrogen at 810° C. The second insulator layer and second electrode layer were deposited to complete the device. This device has a luminance $L_{40}$ of 107 cd/m$^2$ at 60 Hz, or 1965 cd/m$^2$ at 1 KHz drive frequency. This luminance is suitable for commercial production. A blue filter may be used to eliminate the green portion of the spectrum.

In a preferred embodiment the aluminum, gallium or indium is introduced into the layer of the first-deposited host material from an appropriately deposited overlayer during a high temperature anneal of the two layers. Alternatively, the aluminum, gallium or indium may be added to a sputtering target as the appropriate sulfide or selenide at a concentration of 1 to 6 mol %. It is expected that the incorporation of gallium, aluminum, or indium into alkaline earth sulfide or alkaline earth selenide phosphor films deposited by other deposition techniques, such as evaporation, metallo-organic chemical vapor deposition (MOCVD) and atomic layer epitaxy, will improve the performance of those films.

It will also be understood that although the invention has been described primarily in terms of a conventional AC TFEL device which will be viewed with the glass substrate forming the face of a TFEL panel, the phosphor of the present invention may also be used in an inverted structure and viewed from the film side of the structure. In the latter case the first-deposited electrode will be a refractive metal such as molybdenum.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An ACTFEL device comprising (a) An electroluminescent phosphor;

(b) A pair of insulating layers sandwiching said electroluminescent phosphor; and (c) A pair of electrode layers sandwiching said pair of insulating layers; wherein (d) Said electroluminescent phosphor comprises:
  (i) a first phosphor layer selected from the group consisting of an alkaline earth sulfide, an alkaline earth selenide, and an alkaline earth sulfide selenide, and further including an activator dopant; and
  (ii) an overlayer deposited atop the first phosphor layer, said overlayer including a group 3A metal selected from the group aluminum, gallium and indium.

2. The AC TFEL device of claim 1 wherein said host material is selected from the group consisting of calcium sulfide, barium sulfide, strontium sulfide, magnesium sulfide, calcium selenide, barium selenide, strontium selenide, magnesium selenide, CaS$_y$Se$_{1-y}$, BaS$_y$Se$_{1-y}$, SrS$_y$Se$_{1-y}$ and MgS$_y$Se$_{1-y}$ where 0<y<1.

3. The AC TFEL device of claim 1 wherein said activator dopant comprises a rare earth, said rare earth being selected from the group consisting of cerium, europium, praseodymium, and holmium.

4. The AC TFEL device of claim 1 wherein said Group 3A metal is present in said electroluminescent phosphor at a concentration between 1 and 6 mol %.

5. The AC TFEL device of claim 1, said device including a layer of zinc sulfide located between said electroluminescent phosphor and one of said pair of insulating layers.

* * * * *